United States Patent
Yamashita et al.

(10) Patent No.: US 7,155,690 B2
(45) Date of Patent: Dec. 26, 2006

(54) METHOD FOR CO-VERIFYING HARDWARE AND SOFTWARE FOR A SEMICONDUCTOR DEVICE

(75) Inventors: Hiroyuki Yamashita, Yokohama (JP); Takao Shinsha, Yokohama (JP); Hideaki Fujikake, Fukuoka (JP); Toshiaki Kowatari, Oume (JP); Tomoya Hirao, Machida (JP); Atsushi Ohkuma, Kashiwa (JP); Hiroaki Nishi, Yokohama (JP); Michiaki Muraoka, Machida (JP)

(73) Assignee: Seiko Epson Corporation, Tokyo (JP)

( * ) Notice: Subject to any disclaimer, the term of this patent is extended or adjusted under 35 U.S.C. 154(b) by 284 days.

(21) Appl. No.: 10/766,955

(22) Filed: Jan. 30, 2004

(65) Prior Publication Data

US 2005/0149897 A1    Jul. 7, 2005

(30) Foreign Application Priority Data

Jan. 31, 2003    (JP)    .............................. 2003-024706

(51) Int. Cl.
*G06F 17/50* (2006.01)
*G06F 9/45* (2006.01)

(52) U.S. Cl. ........................ 716/5; 716/1; 716/4; 716/8; 716/18; 717/140; 717/146

(58) Field of Classification Search .................... 716/1, 716/8, 18, 4; 703/14, 17, 20, 23, 27; 714/739, 714/37; 710/113; 717/140, 146
See application file for complete search history.

(56) References Cited

U.S. PATENT DOCUMENTS

| | | | | |
|---|---|---|---|---|
| 5,960,182 A | * | 9/1999 | Matsuoka et al. ............. | 703/17 |
| 6,152,612 A | * | 11/2000 | Liao et al. ..................... | 703/23 |
| 6,279,146 B1 | * | 8/2001 | Evans et al. ................... | 716/18 |
| 6,327,650 B1 | * | 12/2001 | Bapst et al. ................. | 712/228 |
| 6,470,481 B1 | * | 10/2002 | Brouhard et al. .............. | 716/5 |
| 6,530,054 B1 | * | 3/2003 | Hollander .................... | 714/739 |
| 6,629,174 B1 | * | 9/2003 | Farkas et al. ................ | 710/113 |
| 6,634,012 B1 | * | 10/2003 | Zhong et al. ................... | 716/5 |

(Continued)

FOREIGN PATENT DOCUMENTS

JP    10-149382    2/1998

(Continued)

OTHER PUBLICATIONS

Semeria et al., "Methodology for hardware/software co-verification in C/C++", Jan. 25-28, 2000, Design Automation Conference. Proceedings of the ASP-DAC, Asia and South Pacific□□pp. 405-408 □□□□.*

(Continued)

*Primary Examiner*—Jack Chiang
*Assistant Examiner*—Helen Rossoshek
(74) *Attorney, Agent, or Firm*—Staas & Halsey LLP

(57) ABSTRACT

A hardware/software co-verification method that achieves fast simulation execution by implementing a C-based native code simulation without degrading the accuracy of timing verification. This method is a method for co-verifying hardware and software, by using a host CPU, for a semiconductor device on which at least one target CPU and one OS are mounted wherein, first, a timed software component described in a C-based language or constructed from binary code native to the host CPU and a hardware component described in the C-based language are input as verification models, necessary compiling is performed, and the compiled components are linked together. Next, a testbench is input and compiled. Then, the components and the testbench are linked together, after which simulation is performed and the result of the simulation is output.

7 Claims, 12 Drawing Sheets

U.S. PATENT DOCUMENTS

| | | | | |
|---|---|---|---|---|
| 6,678,645 | B1* | 1/2004 | Rajsuman et al. | 703/20 |
| 6,701,501 | B1* | 3/2004 | Waters et al. | 716/8 |
| 6,760,888 | B1* | 7/2004 | Killian et al. | 716/1 |
| 6,810,373 | B1* | 10/2004 | Harmon et al. | 703/14 |
| 7,020,854 | B1* | 3/2006 | Killian et al. | 716/1 |
| 7,024,660 | B1* | 4/2006 | Andrade et al. | 717/124 |
| 2002/0059054 | A1* | 5/2002 | Bade et al. | 703/20 |
| 2004/0015739 | A1* | 1/2004 | Heinkel et al. | 714/37 |
| 2005/0125754 | A1* | 6/2005 | Schubert et al. | 716/5 |
| 2005/0149898 | A1* | 7/2005 | Hakewill et al. | 716/18 |
| 2005/0289485 | A1* | 12/2005 | Willis | 716/1 |

FOREIGN PATENT DOCUMENTS

| | | |
|---|---|---|
| JP | 2000-259445 | 9/2000 |
| JP | 2001-256072 | 9/2001 |
| JP | 2002-175344 | 6/2002 |

OTHER PUBLICATIONS

Carbognani et al., "Qualifying precision of abstract SystemC models using the SystemC verification standard", 2003, Design, Automation and Test in Europe Conference and Exhibition, pp. 88-94 □□.*

Jindal et al., "Verification of transaction-level SystemC models using RTL testbenches", Jun. 24-26, 2003, Formal Methods and Models for Co-Design, MEMOCODE '03. Proceedings. First ACM and IEEE International Conference on, pp. 199-203.*

Sherwood, Timothy, et al., "Basic Block Distribution Analysis to Find Periodic Behavior and Stimulation Points in Applications", International Conference on Parallel Architectures and Complication Techniques, Sep. 2001.

Knapp, D., et al., "Behavioral Synthesis Methodology for HDL-Based Specification and Validation", Proc. Design Automation Conf. Jun. 1995.

Ly, Tai, et al., "Scheduling Using Behavioral Templates", Proc. Design Automation Conf. Jun. 1995.

Gauthier, Lovic, et al., "Automatic Generation and Targeting of Application Specific Operating Systems and Embedded Systems Software", Proc. Design Automation and Test in Europe, Mar. 2001.

Lyonnard, Damien, "Automatic Generation of Application-Specific Architectures for Heterogeneous Multiprocessor System-on-Chip", Proc. Design Automation Conf., Jun. 2001.

Yoo, Sungjoo, et al., "Automatic Generation of Fast Timed Simulation Models for Operating Systems in SoC Design", Proc. Design Automation and Test in Europe, Mar. 2002.

Ikegami, Kurokawa, et al., "Analysis and Prospects for a C-based Behavioral System LSI Design Flow", IEICE 15th Workshop on Circuits and Systems in Karuzawa, Apr. 22-23, 2002.

Yasuda et al., "A Top-down Hardware/Software Co-simulation Method for Embedded Systems Based on a Component Logical Bus Architecture," DA Symposium '98, IPSJ, Jul. 17, 1998, vol. 98, No. 9, pp. 7-12.

* cited by examiner

Fig.4

| SOFTWARE COMPONENTS | DESIGN LOGIC DESCRIPTION LANGUAGE | METHOD OF VERIFICATION MODEL CREATION | | | VERIFICATION MODEL DESCRIPTION LANGUAGE |
|---|---|---|---|---|---|
| | | CONVERSION 1*1 | MODIFICATION*2 | CONVERSION 2*3 | |
| OS/ MIDDLEWARE | ANSI-C | — | — | O | C-BASED LANGUAGE |
| INTERRUPT HANDLER | ANSI-C AND ASSEMBLY LANGUAGE | O | — | O | C-BASED LANGUAGE |
| DEVICE DRIVER | ANSI-C AND ASSEMBLY LANGUAGE | O | O | O | C-BASED LANGUAGE |
| TASK | ANSI-C | — | — | O | C-BASED LANGUAGE |

*1: CONVERSION FROM ASSEMBLY LANGUAGE DESCRIPTION TO ANSI-C DESCRIPTION (MANUAL)
*2: MODIFICATION FOR "DIRECT READ/WRITE ACCESS TO BUS" (MANUAL)
*3: CONVERSION FROM UNTIMED SOFTWARE COMPONENT TO TIMED SOFTWARE COMPONENT (AUTOMATIC)

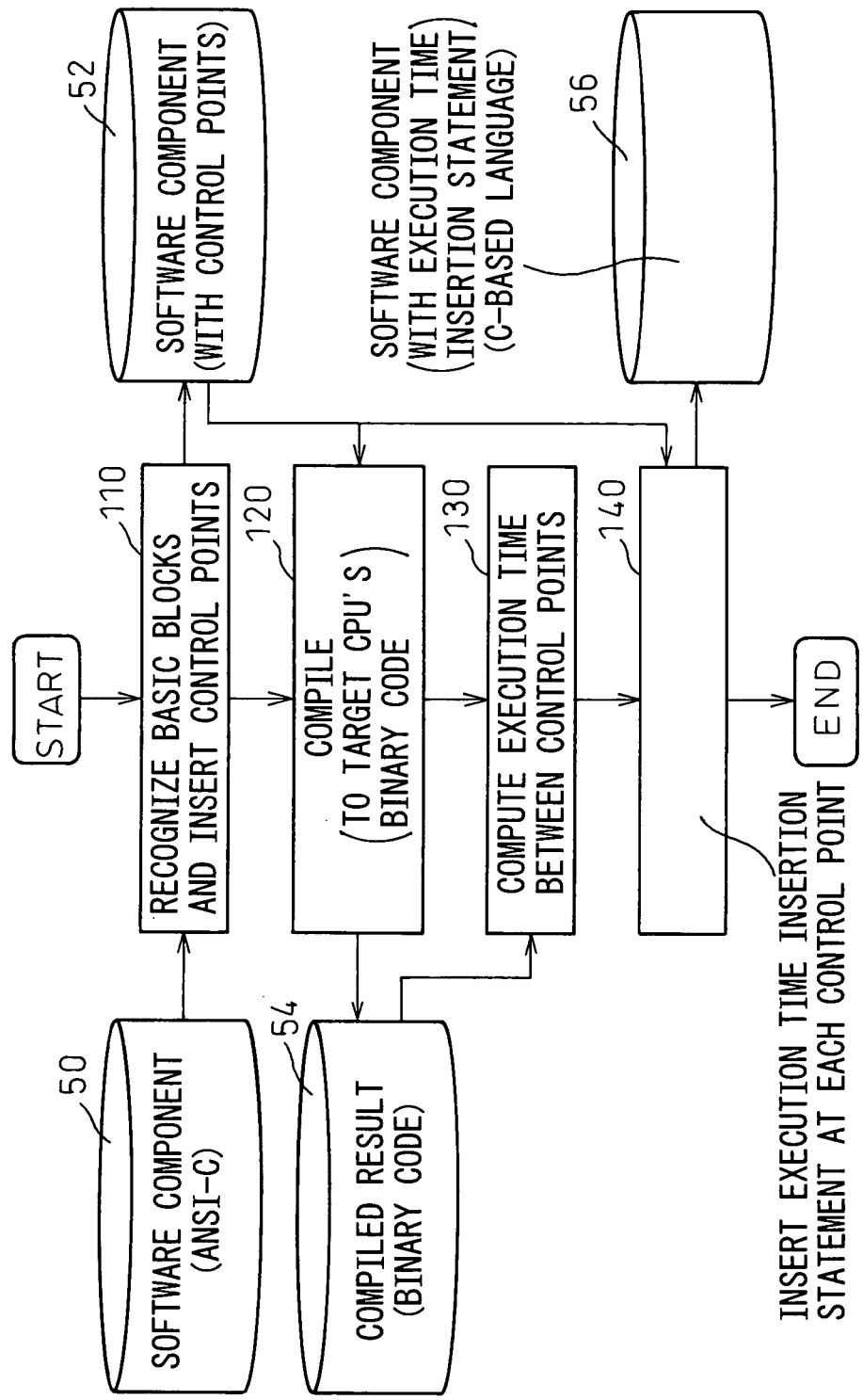

METHOD FOR CO-VERIFYING HARDWARE AND SOFTWARE FOR A SEMICONDUCTOR DEVICE

BACKGROUND OF THE INVENTION

1. Field of the Invention

The present invention relates to a method for co-verifying hardware and software to be mounted on a semiconductor device.

2. Description of the Related Art

In recent years, apparatuses equipped with SoCs have been spreading widely. SoC is an acronym for System on a Chip, and refers to a technology for packing the core functions of a computer onto a single chip (semiconductor device) or refers to the chip itself on which the core functions of a computer are integrated using the SoC technology.

FIG. 1 shows an upstream design flow for such a SoC. As shown, after completing the design at the system level, the process proceeds to the design at the architecture level. In the architecture-level design, the selection of basic components, such as a CPU (Central Processing Unit), OS (Operating System), bus, etc., the division of functions between hardware and software, and hardware and software designs are performed. Then, for the basic components, hardware components, and software components obtained from the architecture-level design, hardware/software co-verification is performed using verification models.

Generally, in such hardware/software co-verification, an ISS (Instruction Set Simulator) which performs simulation at the instruction level is used as the verification model for the CPU, as disclosed in patent documents 1 to 3 given below. The ISS is written using a C-based language; System-G (produced by GAIO Technology), etc. is a known example of a commercially available simulator. In this specification, the "C-based language" refers to one of various extended ANSI-C/C++ languages or, more specifically, either SpecC or SystemC.

Verification models written in the C-based language are also used for hardware components such as a CPU dedicated memory, bus, etc. For other hardware components, verification models based on a behavioral description or an RTL (Register Transfer Level) description, created using the C-based language, are used. The behavioral description is one that describes circuit behavior, while the RTL description is one that describes how register values change.

On the other hand, verification models for software components, such as the OS, middleware, interrupt handler, device drivers, tasks, etc., are constructed using the real logic, i.e., the binary code (instruction code) itself, for the target CPU. In this specification, the "target CPU" refers to the CPU (for example, an ARM processor) mounted on a semiconductor device, such as an SoC, to be verified.

By adding a testbench and a C-based simulator to the above verification models (software components and hardware components), a prior art co-verification system (software configuration) such as shown in FIG. 2 is constructed. The testbench performs operations such as a test data input, test data output, comparisons with expected values, etc., while the C-based simulator controls the entire operation of the simulation. The ISS operates by accepting a maskable interrupt INT (maskable INTerrupt) from a hardware component or a nonmaskable interrupt NMI (NonMaskable Interrupt) from the testbench.

The ISS provides the functions of instruction-level simulation, memory access (load/store instruction), I/O access, and interrupt processing. The instruction-level simulation function executes simulation at the binary code level of the target CPU. The memory access function executes a read/write access to the bus. Here, the bus controls the memory access. The I/O access function executes a read/write access to the bus using a load/store instruction (the amount of data transfer per instruction is small). Here, the bus controls the I/O (hardware component) access. The interrupt processing function executes such operations as accepting an interrupt (INTi (i=1, . . . , n), NMI), controlling the activation of the interrupt handler, interrupting the processing being performed, and resuming the interrupted processing.

Prior art literature concerning co-verification using an ISS includes non-patent documents 1 and 2 shown below as well as the patent documents 1 to 3. Non-patent document 3 listed below concerns a "Basic Block" which will be cited in the description given later in this specification, non-patent documents 4 to 6 concern a "Fixed I/O Behavioral Model" which will be cited in the description given later in this specification, and non-patent documents 7 to 9 concern technical trends in design and verification based on the C language.

(Patent Document 1) Japanese Unexamined Patent Publication No. 2000-259445

(Patent Document 2) Japanese Unexamined Patent Publication No. 2001-256072

(Patent Document 3) Japanese Unexamined Patent Publication No. 2002-175344

(Non-patent Document 1) Kazutoshi Wakabayashi, "LSI Design and Behavioral Synthesis using C Language and Methodology for HW/SW Co-verification," NE Embedded Symposium 2002.

(Non-patent Document 2) Kurokawa, Ikegami, Ootsubo, Asao, Kirigaya, Misu, Takahashi, Kawatsu, Nitta, Kasa, Wakabayashi, Tomobe, Takahashi, Mukaiyama, and Takenaka, "Analysis and Study on Effectiveness of System LSI Design Methodology using C-Language-Based Behavioral Synthesis," IEICE 15th Karuizawa Workshop, pp. 131–142, April 2002.

(Non-patent Document 3) T. Sherwood, E. Perelman, and B. Calder, "Basic Block Distribution Analysis to Find Periodic Behavior and Simulation Points in Applications," in International Conference on Parallel Architectures and Compilation Techniques, September 2001.

(Non-patent Document 4) D. W. Knapp, T. Ly, D. MacMillen, and R. Miller, "Behavioral Synthesis Methodology for HDL-Based Specification and Validation," Proc. Design Automation Conf., June 1995.

(Non-patent Document 5) T. Ly, D. W. Knapp, R. Miller, and D. MacMillen, "Scheduling using Behavioral Templates," Proc. Design Automation Conf., June 1995.

(Non-patent Document 6) D. W. Knapp, "Behavioral Synthesis: Digital System Design using the Synopsis Behavioral Compiler," Prentice Hall PTR.

(Non-patent Document 7) L. Gauthier, S. Yoo, and A. A. Jerraya, "Automatic Generation and Targeting of Application Specific Operating Systems and Embedded Systems Software," Proc. Design Automation and Test in Europe, March 2001.

(Non-patent Document 8) D. Lyonnard, S. Yoo, A. Baghdadi, and A. A. Jerraya, "Automatic Generation of Application-Specific Architectures for Heterogeneous Multiprocessor System-on-Chip," Proc. Design Automation Conf., June 2001.

(Non-patent Document 9) S. Yoo, G. Nicolescu, L. Gauthier, and A. A. Jerraya, "Automatic Generation of Fast Timed Simulation Models for Operating Systems in SoC," Proc. Design Automation and Test in Europe, March 2002.

In the hardware/software co-verification methods using ISSs according to the prior art described above, as simulation is performed at the instruction level, that is, simulation is performed on an instruction-by-instruction basis by interpreting the contents of each instruction, which requires a memory access, the prior art involves the problem that the simulation time, i.e., the verification time, increases.

SUMMARY OF THE INVENTION

The present invention has been devised in view of the above problem, and an object of the invention is to provide a hardware/software co-verification method that achieves fast simulation execution by implementing a C-based native code simulation that eliminates the need for per-instruction interpretation and execution, without degrading the accuracy of simulation with respect to timing.

In the following description, the term "untimed software component" means a software component the entire processing of which is written in ANSI-C, or a software component constructed from binary code for executing the entire processing thereof. On the other hand, the term "timed software component" means a software component the entire processing of which is divided into a plurality of processing units, and in which an ANSI-C description describing the processing of each unit is followed by a C-based language description (execution time insertion statement) describing the execution time of that processing unit, or a software component the entire processing of which is divided into a plurality of processing units, and in which binary code for executing the processing of each unit is followed by binary code functionally equivalent to a C-based language description (execution time insertion statement) describing the execution time of that processing unit. Further, the term "host CPU" means the CPU (for example, Pentium (registered trademark) processor) mounted on a personal computer (PC) or a workstation (WS) that performs the co-verification.

To achieve the above object, according to a first aspect of the present invention, there is provided a method for co-verifying hardware and software, by using a host CPU, for a semiconductor device on which at least one target CPU and one OS are mounted, the hardware/software co-verification method comprising the steps of: (a) inputting as a verification model a timed software component described in a C-based language and compiling the same, inputting as a verification model a hardware component described in the C-based language and compiling the same, and linking together the compiled timed software component and the compiled hardware component; (b) inputting a testbench and compiling the same; (c) linking together the verification models processed in step (a) and the testbench processed in step (b); (d) performing a simulation based on an executing program generated in step (c); and (e) outputting a result of the simulation performed in step (d).

According to a second aspect of the present invention, there is provided a method for co-verifying hardware and software, by using a host CPU, for a semiconductor device on which at least one target CPU and one OS are mounted, the hardware/software co-verification method comprising the steps of: (a) inputting as a verification model a timed software component constructed from binary code native to the host CPU, inputting as a verification model a hardware component described in a C-based language and compiling the same, and linking together the input timed software component and the compiled hardware component; (b) inputting a testbench and compiling the same; (c) linking together the verification models processed in step (a) and the testbench processed in step (b); (d) performing a simulation based on an executing program generated in step (c); and (e) outputting a result of the simulation performed in step (d).

According to a third aspect of the present invention, there is provided a method for co-verifying hardware and software, by using a host CPU, for a semiconductor device on which at least one target CPU and one OS are mounted, the hardware/software co-verification method comprising the steps of: (a) inputting as a verification model a timed software component described in a C-based language and compiling the same, inputting, as a verification model, a timed software component constructed from binary code native to the host CPU and compiling the same, inputting as a verification model a hardware component described in the C-based language and compiling the same, and linking together the compiled or input timed software components and the compiled hardware component; (b) inputting a testbench and compiling the same; (c) linking together the verification models processed in step (a) and the testbench processed in step (b); (d) performing a simulation based on an executing program generated in step (c); and (e) outputting a result of the simulation performed in step (d).

According to a fourth aspect of the present invention, in order to generate in advance the timed software component described in the C-based language from an untimed software component described in ANSI-C, the method according to the first or third aspect of the invention further comprises the steps of: inputting the untimed software component described in ANSI-C, and recognizing basic blocks and inserting control points; generating binary code native to a target CPU by compiling the untimed software component in which the control points have been inserted; computing execution time between the control points in the generated binary code native to the target CPU; and inserting, in accordance with the computed execution time, an execution time insertion statement at each of the control points inserted in the untimed software component, and thus outputting the timed software component described in the C-based language.

According to a fifth aspect of the present invention, in order to generate in advance the timed software component constructed from the binary code native to the host CPU from an untimed software component constructed from binary code native to a target CPU, the method according to the second or third aspect of the invention further comprises the steps of: inputting the untimed software component constructed from the binary code native to the target CPU, and converting the same into a software component expressed in the binary code native to the host CPU; recognizing basic blocks and inserting control points in the software component expressed in the binary code native to the host CPU; computing execution time between the control points in the software component in which the control points have been inserted; and inserting, in accordance with the computed execution time, binary code functionally equivalent to an execution time insertion statement at each of the control points inserted in the software component, and thus outputting the timed software component constructed from the binary code native to the host CPU.

BRIEF DESCRIPTION OF THE DRAWINGS

Further features and advantages of the present invention will be apparent from the following description with reference to the accompanying drawings, in which:

FIG. 4 is a diagram for explaining a method of creating verification models for software components;

FIG. 5 is a flowchart for explaining the execution procedure of a program which performs conversion from an untimed software component described in ANSI-C to a timed software component described in a C-based language;

DESCRIPTION OF THE PREFERRED EMBODIMENTS

An embodiment of the present invention will be described below with reference to the accompanying drawings.

Figure 1:
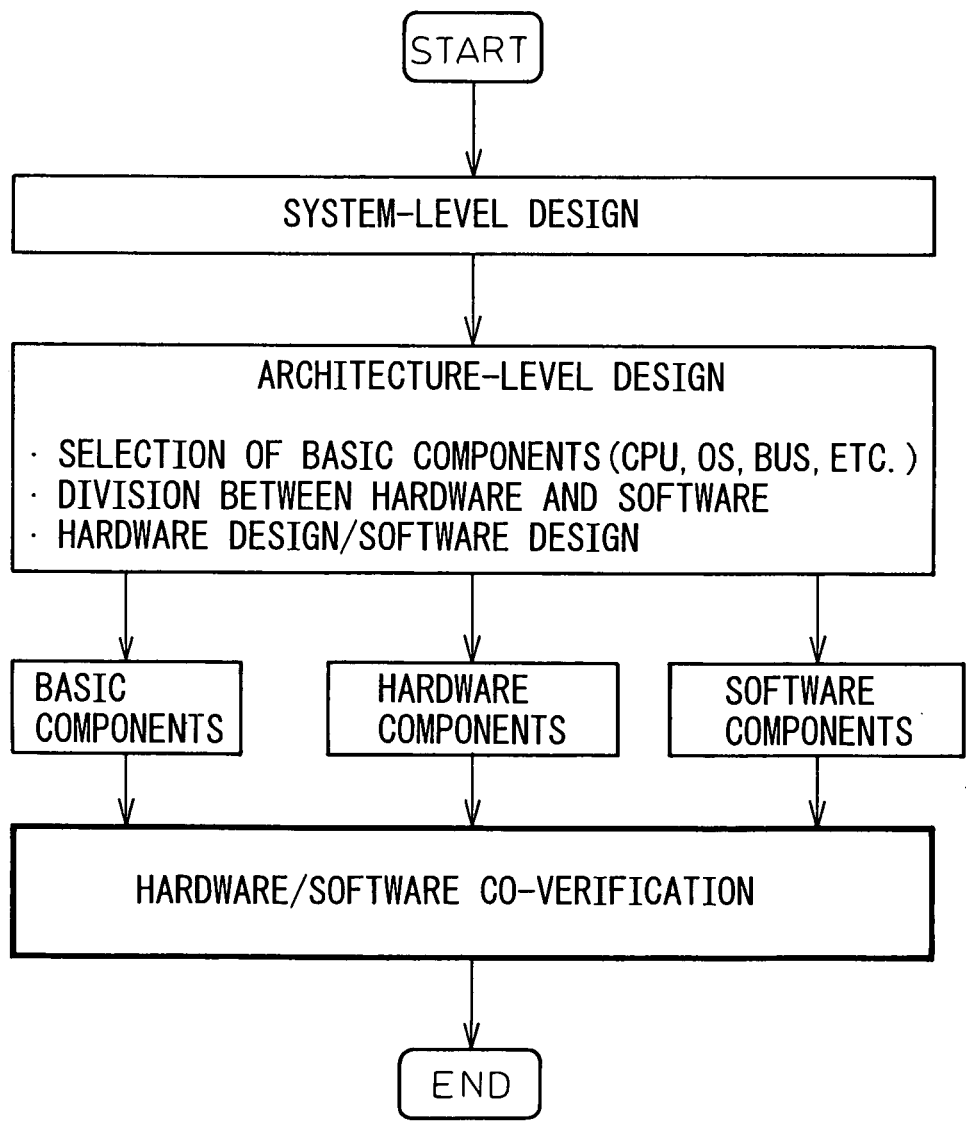
FIG. 1 is a diagram showing an upstream design flow for an SoC.
Figure 2:
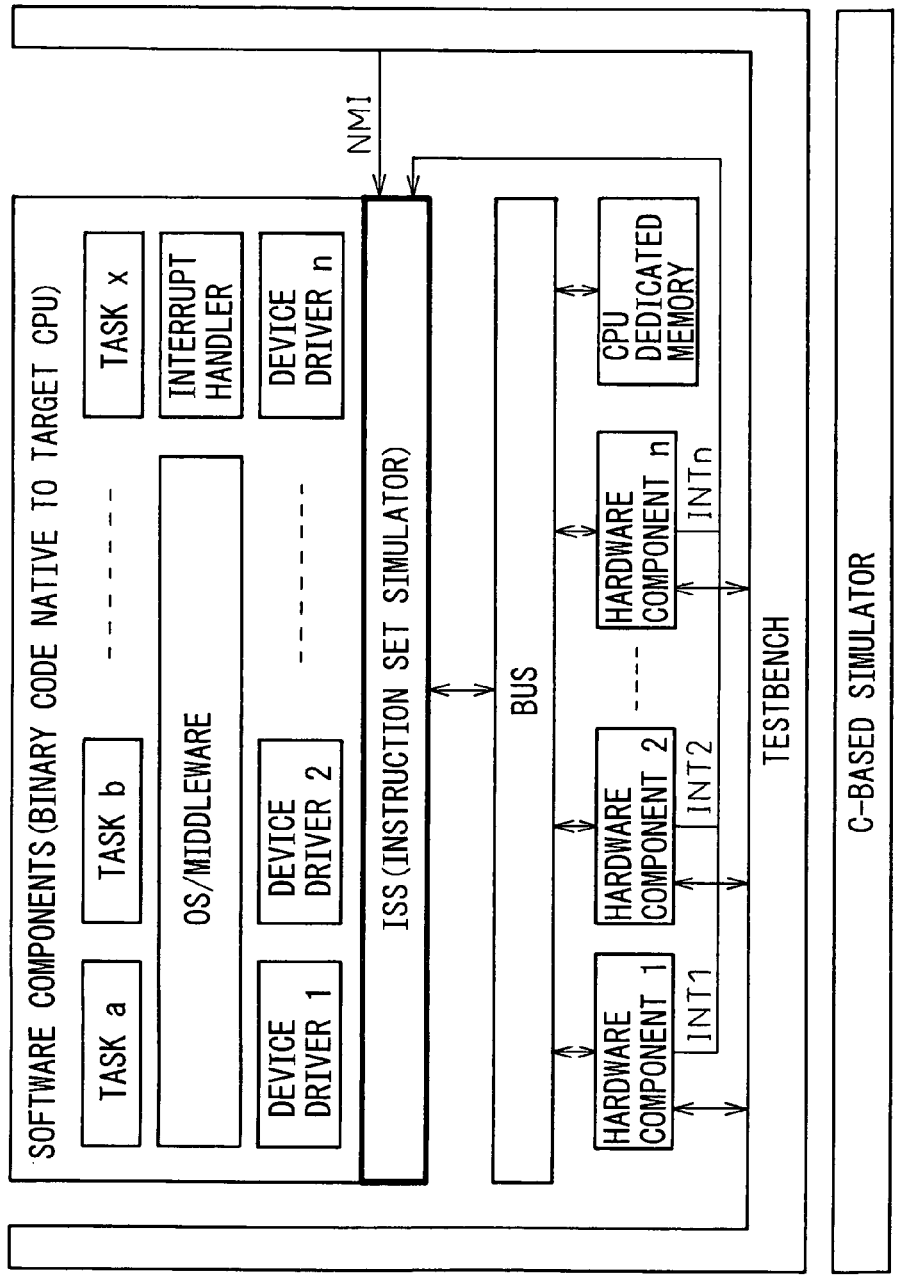
FIG. 2 is a block diagram showing the configuration (software configuration) of a hardware/software co-verification system according to the prior art.
Figure 3:
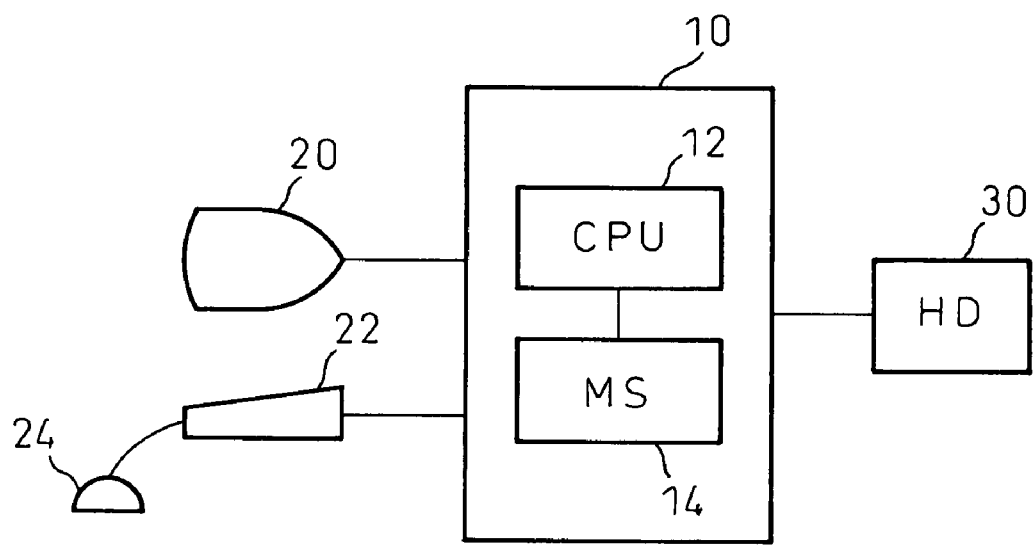
FIG. 3 is a block diagram showing one example of a hardware environment for implementing a hardware/software co-verification method according to the present invention.

FIG. 3 is a diagram for explaining a hardware environment for implementing a hardware/software co-verification method according to the present invention. As shown as an example in the figure, co-verification according to the present invention can be run on a conventional personal computer (PC) or a workstation (WS), which comprises a computer main unit 10 having a central processing unit (CPU) 12 and a main storage (MS) 14, a display 20, a keyboard 22, a mouse 24, and an external storage 30 such as a hard disk drive.

The CPU 12 operates as a host CPU for executing the co-verification, and is, for example, a Pentium (registered trademark) processor. Programs for co-verification described hereinafter are executed by the CPU 12. Various kinds of data, files, etc. are loaded from the external storage 30 into the main storage (MS) 14 for processing.

Next, referring to FIG. 4, a description will be given of a method of creating verification models for software components among the various components to be mounted on an SoC (semiconductor device) for which the hardware/software co-verification is to be performed. Of the software components shown in the example of FIG. 4, the OS/middleware and task are logic-designed using only ANSI-C, but the design logic of the interrupt handler and device driver contains descriptions written in an assembly language as well as descriptions written in ANSI-C. Therefore, the descriptions written in the assembly language are first converted into descriptions in ANSI-C. This conversion is done manually.

Further, for the device driver, the description is converted manually so that a read/write access will be done directly to the bus. That is, in the prior art ISS, the speed has been slow because the I/O access has been performed using a load/store instruction with which the amount of data transfer per instruction is small, but in the present embodiment, higher speed is achieved for the I/O access.

Finally, for the OS/middleware, the interrupt handler, the device drivers, and the tasks, which are all described in ANSI-C, conversion from an untimed software component (described in ANSI-C) to a timed software component (described in C-based language) is performed in accordance with the program described hereinafter.

Figure 6:
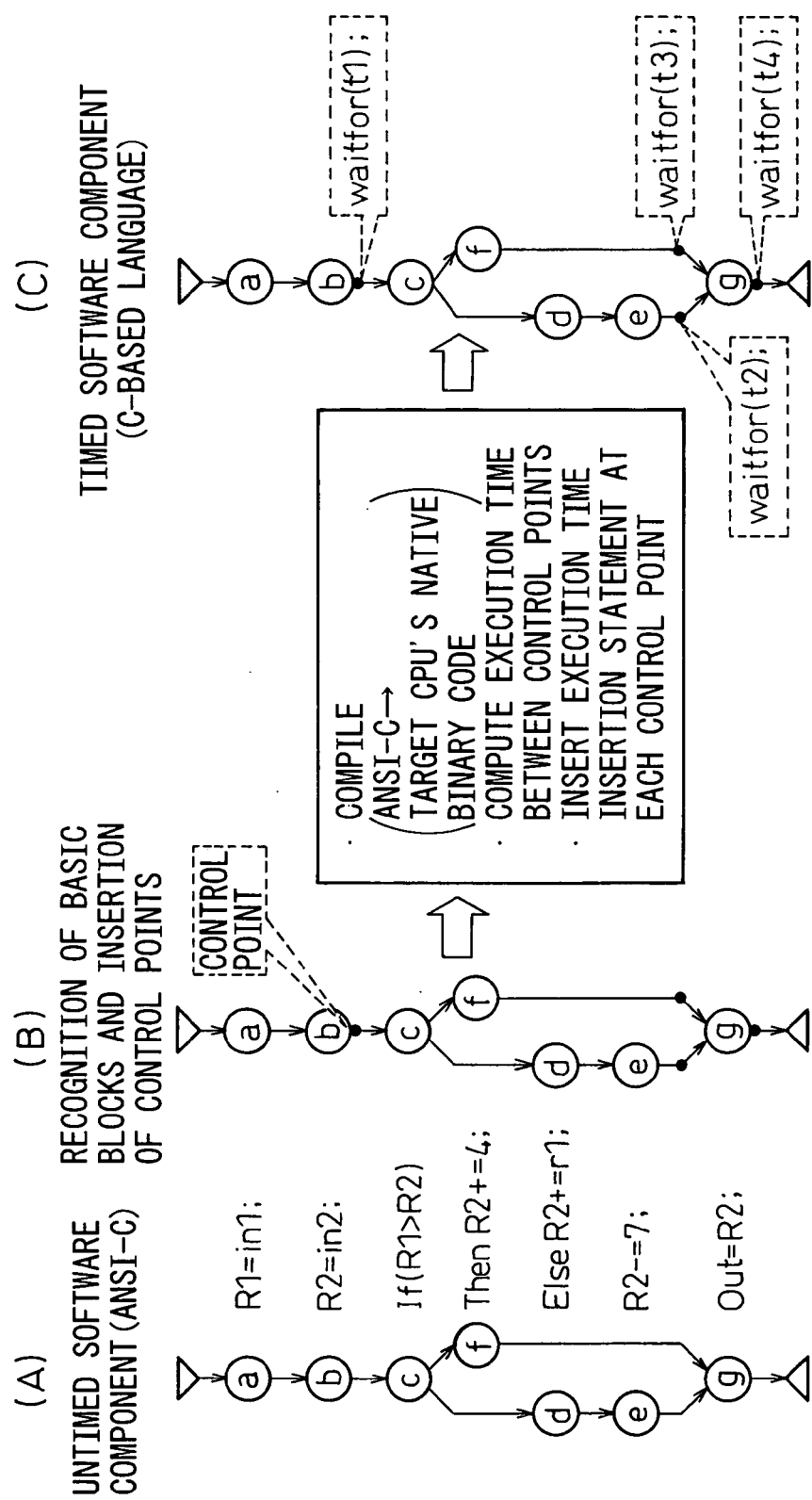
FIG. 6 is a diagram for explaining the details of how the untimed software component described in ANSI-C is converted into the timed software component described in the C-based language.

FIG. 5 is a flowchart for explaining the execution procedure of the program which performs the conversion from an untimed software component described in ANSI-C to a timed software component described in the C-based language. FIG. 6 is a diagram for explaining the details of the conversion process.

First, in step 110 of FIG. 5, an untimed software component 50 described in ANSI-C is input and, by recognizing basic blocks and inserting control points, an untimed software component (described in ANSI-C) 52 with the control points inserted therein is output. The basic blocks each indicate a portion where the program runs straight, the details of which are described in the previously given non-patent document 3. Control points are inserted before and after the thus recognized basic blocks.

More specifically, in the untimed software component (described in ANSI-C) shown in FIG. 6(A), node "a" and node "b" are recognized as one basic block, node "c", node "d", and node "e" are recognized as one basic block, node "c" and node "f" are recognized as one basic block, and node "g" is recognized as one basic block. Accordingly, the control points are inserted, one between node "b" and node "c", another between node "e" and node "g", another between node "f" and node "g", and the remaining one after node "g", as shown in FIG. 6(B).

In step 120, binary code 54 native to the target CPU is generated by compiling the untimed software component (described in ANSI-C) 52 in which the control points have been inserted as described above.

Next, in step 130, execution time between each control point is computed based on the target CPU's native binary code (instruction code) 54 generated in the above compiling step. The computation is done in accordance with the arithmetic expression kΣ[number of cycles per instruction]

Here, the coefficient k is an overhead coefficient associated with a cache miss in a cache memory; in the present embodiment, since no cache memory model is provided, the coefficient k is introduced to enable statistical processing.

In the final step 140, an execution time insertion statement corresponding to the execution time computed in step 130 is inserted at each control point inserted in the untimed software component 52, and the resulting component is output as a timed software component 56 described in the C-based language.

For example, suppose that, in step 130, the execution time of node "a" and node "b" shown in FIG. 6(B) was computed as t1, the execution time of node "c", node "d", and node "e" was computed as t2, the execution time of node "c" and node "f" was computed as t3, and the execution time of node "g" was computed as t4. In that case, a waitfor(t1) is inserted as the execution time insertion statement at the control point between node "b" and "c", as shown in FIG. 6(C). Likewise, a waitfor(t2) is inserted as the execution time insertion statement at the control point between node "e" and "g", a waitfor(t3) is inserted as the execution time insertion statement at the control point between node "f" and "g", and a waitfor(t4) is inserted as the execution time insertion statement at the control point after node "g".

Figure 7:
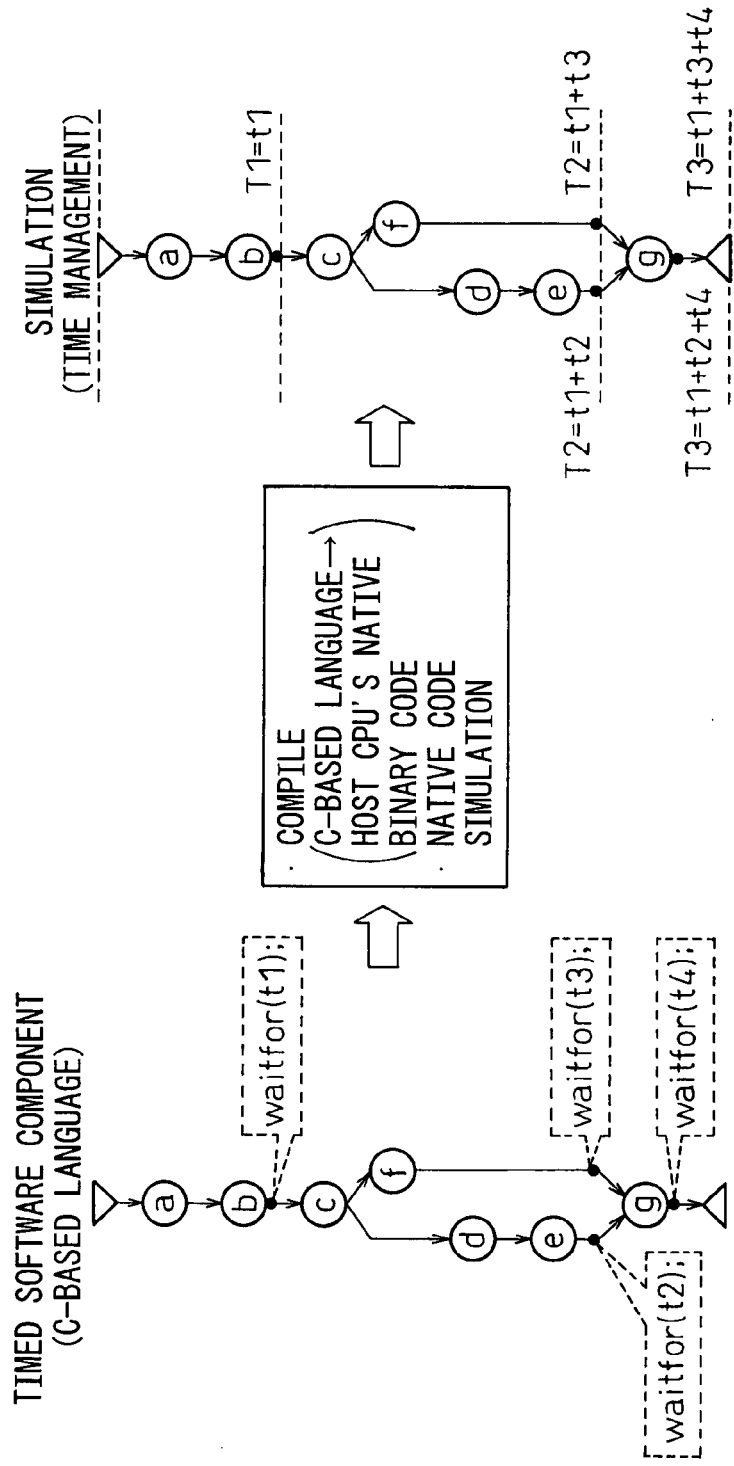
FIG. 7 is a diagram for explaining a C-based simulation which is performed based on the timed software component described in the C-based language.

FIG. 7 is a diagram for explaining a C-based simulation which is performed based on the thus created timed software component 56 described in the C-based language. By compiling the timed software component 56 described in the C-based language, binary code native to the host CPU is generated, thus making the native code simulation possible in the host CPU 12 (FIG. 3).

That is, when the host CPU's native binary code generated by compiling the timed software component 56 described in the C-based language is run on the host CPU, speedup by a factor of 100 to 1000 can be achieved compared with the case where an ISS is used which performs simulation on an instruction-by-instruction basis by interpreting the contents of each instruction.

On the other hand, as the instruction execution time can be managed with the simulator interpreting the contents of each waitfor statement as it appears during the process of the simulation, the accuracy of simulation with respect to timing can be maintained. More specifically, after executing the instruction code corresponding to node "b", the accumulated processing time T1=t1 is obtained by interpreting the instruction code of waitfor(t1). Likewise, after executing the instruction code corresponding to node "e", the accumulated processing time T2=t1+t2 is obtained, and after executing the instruction code corresponding to node "f", the accumulated processing time T2=t1+t3 is obtained.

Then, after executing the instruction code corresponding to node "g", the accumulated processing time T3=t1+t2+t4 is obtained if the program has run along the route passing through node "c", node "d", and node "e"; on the other hand, if the program has run along the route passing through node "c" and node "f", the accumulated processing time T3=t1+t3+t4 is obtained.

Here, the software component verification model creation method of FIG. 5, which creates a timed software component described in the C-based language from an untimed software component described in ANSI-C, requires the acquisition of the source code (ANSI-C) of the untimed software component, but source code is not usually available for most OSs and middleware. Therefore, in the present embodiment, the untimed software component constructed from the target CPU's native binary code is converted into the timed software component expressed in the host CPU's native binary code.

Figure 8:
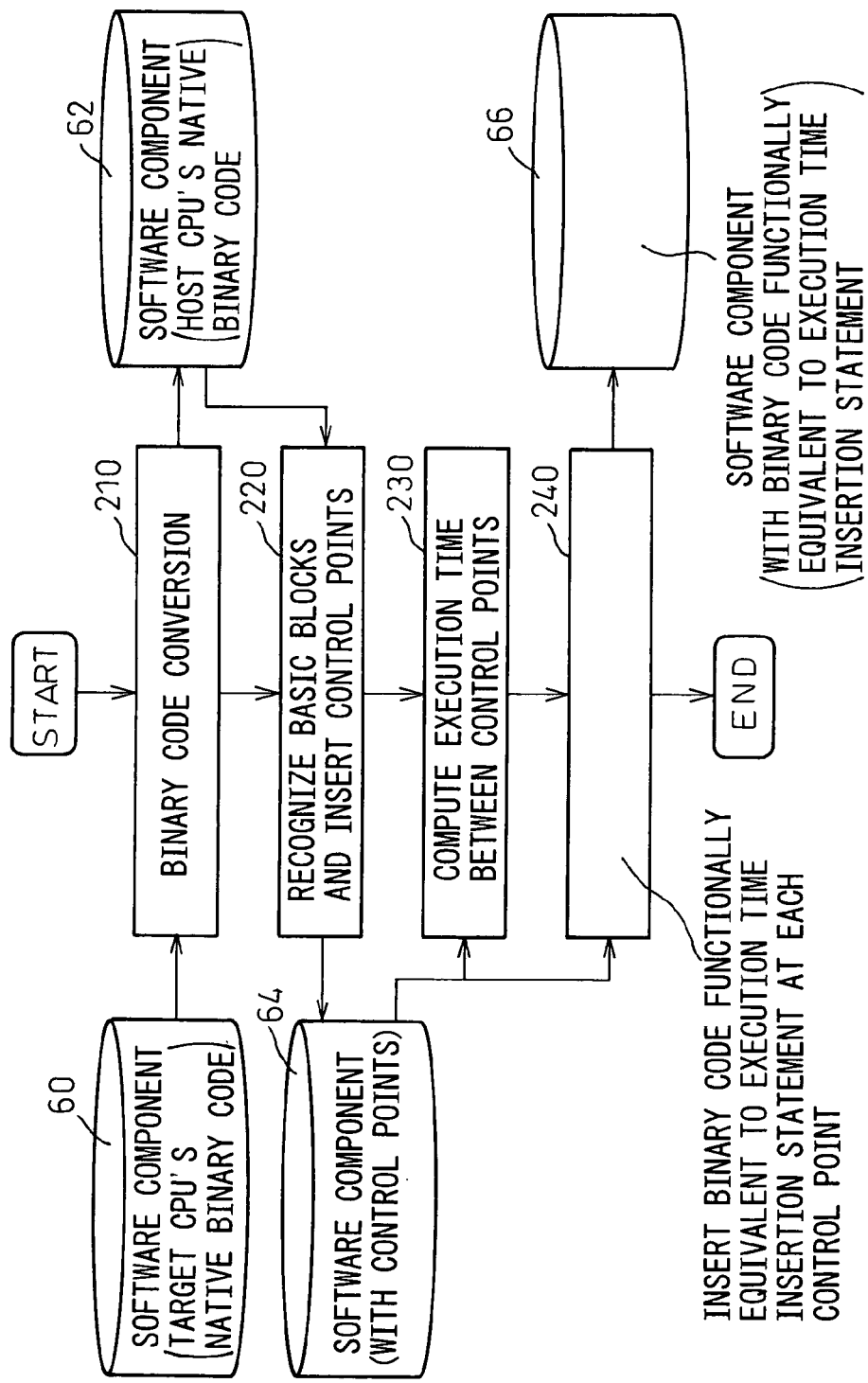
FIG. 8 is a flowchart for explaining the execution procedure of a program which performs conversion from the untimed software component constructed from the target CPU's native binary code into the timed software component expressed in the host CPU's native binary code.

FIG. 8 is a flowchart for explaining the execution procedure for the program which performs the conversion from the untimed software component constructed from the target CPU's native binary code into the timed software component expressed in the host CPU's native binary code. First, in step 210, the untimed software component 60 constructed from the target CPU's native binary code is input, and converted into the timed software component 62 expressed in the host CPU's native binary code. The conversion can be implemented using a tool such as Dynamic (a tool produced by Transitive Technologies).

In step 220, as in the previously described step 110 (FIG. 5), basic blocks are recognized for the software component 62 constructed from the host CPU's native binary code, and a software component 64 with control points inserted therein is output.

Next, in step 230, as in the previously described step 130 (FIG. 5), execution time between each control point is computed for the software component 64 in which the control points have been inserted. The computation is done in accordance with the arithmetic expression $$k\Sigma[\text{number of cycles per instruction}]$$

Here, the coefficient k is an overhead coefficient associated with a cache miss in a cache memory.

In the final step 240, binary code functionally equivalent to the execution time insertion statement corresponding to the computed execution time is inserted at each control point inserted in the software component 64, and the resulting component is output as the timed software component 66 expressed in the host CPU's native binary code.

Next, a description will be given of a method of creating verification models for hardware components among the various components to be mounted on the SoC (semiconductor device) for which the hardware/software co-verification is to be performed. In the prior art hardware/software co-verification, verification models for the CPU and the CPU dedicated memory were constructed, as previously described, but in the present embodiment, these verification models are not created; instead, an IRS (Interrupt Routine Scheduler) is newly introduced which is equivalent to the interrupt processing section of the ISS (Instruction Set Simulator) but is provided as an independent unit. The IRS is written in the C-based language. The verification model for the bus is newly created using the C-based language, as in the prior art.

For a hardware component described by a behavioral description and logic-designed using the C-based language, the verification model (C-based language) is generated by automatically converting the description in the C-based language to a fixed I/O behavioral model by utilizing an extended function of a behavioral synthesis tool. The fixed I/O behavioral model is equivalent to the timed hardware model using basic blocks, and its details are described in the previously described non-patent documents 4 to 6.

On the other hand, for a hardware component described by an RTL (Register Transfer Level) description and logic-designed using Verilog/VHDL, the verification model (C-based language) is generated by automatically converting the RTL description to an RTL-C-based language model by utilizing HDL Import (a tool produced by CoWare), etc. In this RTL-C-based language model, one state of an FSM (Finite State Machine) represents a operation of one clock.

Figure 9:
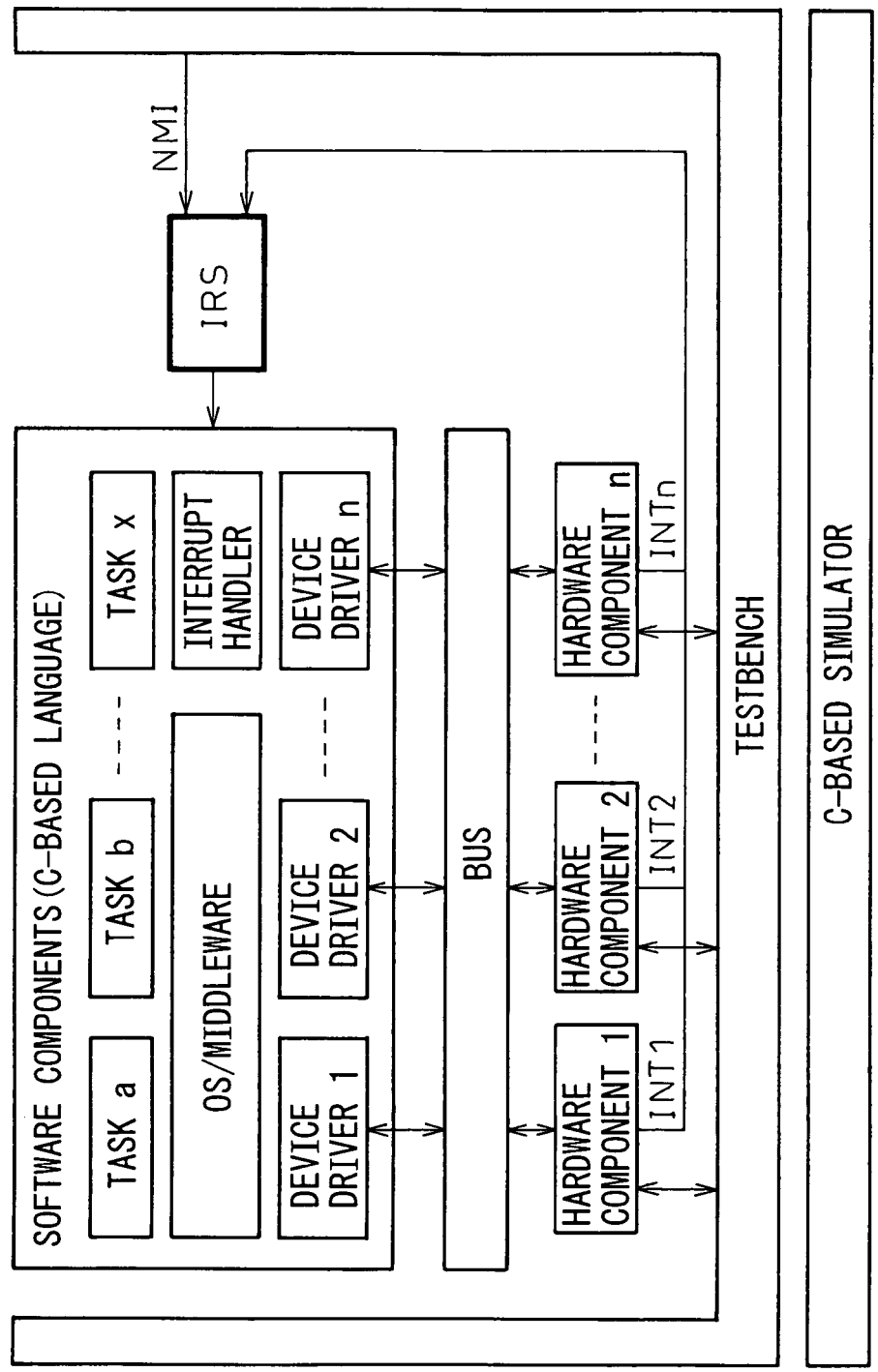
FIG. 9 is a block diagram showing the configuration (software configuration) of a hardware/software co-verification system according to the present embodiment.

By adding a testbench and a C-based simulator to the verification models created for the software components and hardware components as described above, the co-verification system (software configuration) of the present embodiment is constructed as shown in FIG. 9. As previously described, the testbench performs operations such as a test data input, test data output, comparisons with expected values, etc., while the C-based simulator controls the entire operation of the simulation. The IRS implements the function equivalent to a CPU interrupt circuit. INT designates a maskable interrupt, and NMI a nonmaskable interrupt.

Figure 10:
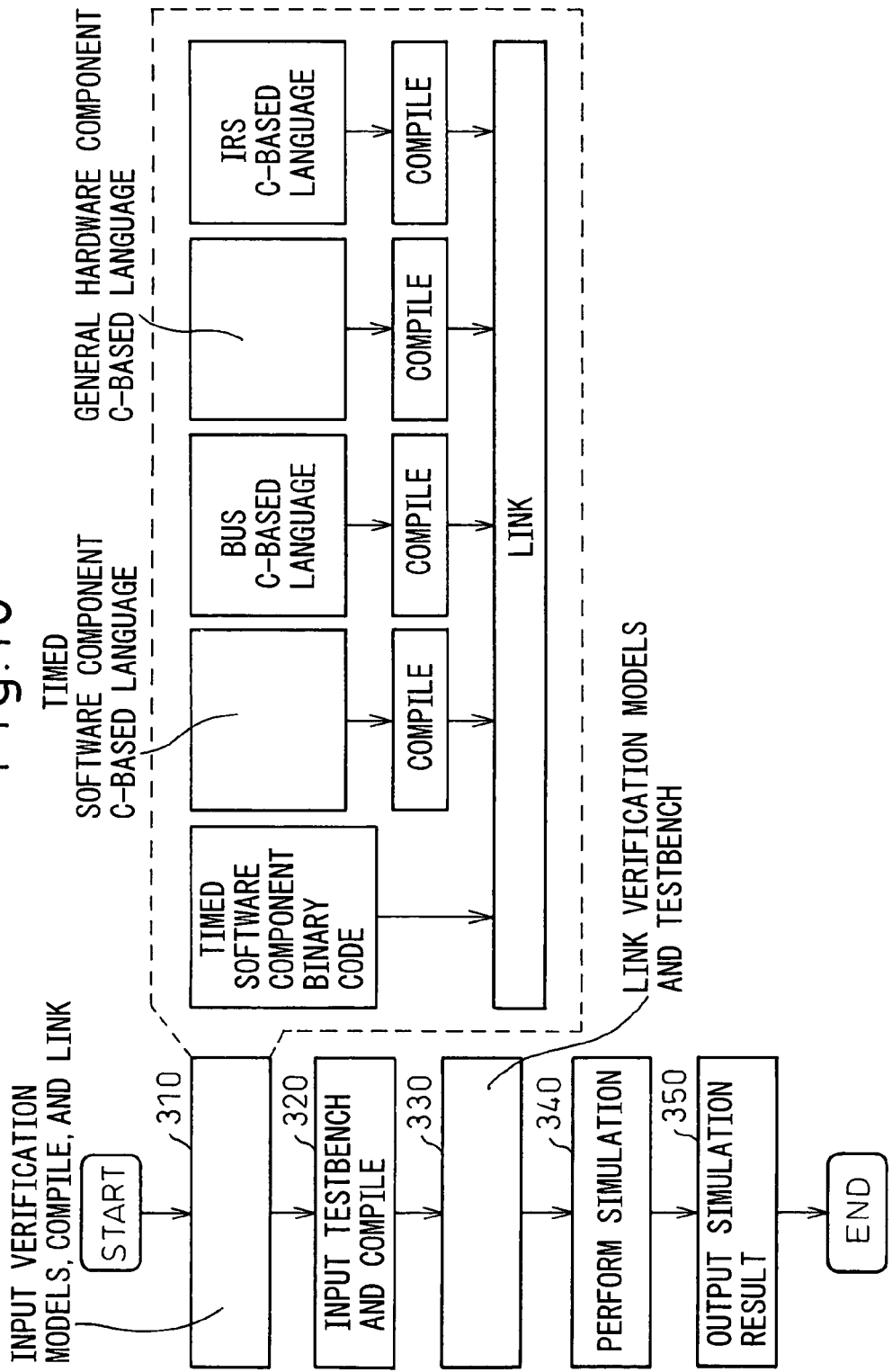
FIG. 10 is a flowchart for explaining the procedure of hardware/software co-verification according to the present embodiment.

FIG. 10 is a flowchart for explaining the procedure of hardware/software co-verification, for a SoC, which is performed under the hardware environment shown in FIG. 3 and the software configuration shown in FIG. 9. First, in step 310, verification models are input, and necessary compiling and linking are performed.

More specifically, the timed software component constructed from the host CPU's native binary code, the timed software component described in the C-based language, the bus described in the C-based language, the general hardware component described in the C-based language, and the IRS described in the C-based language are input as the verification models. For the timed software components, only the timed software component constructed from the host CPU's native binary code may be input, or only the timed software component described in the C-based language may be input, or both of them may be input. The software components include, as previously described, the OS/middleware, interrupt handler, device drivers, tasks, etc. The general hardware component refers to the hardware components other than the CPU, CPU dedicated memory, and bus.

The timed software component described in the C-based language, the bus described in the C-based language, the general hardware component described in the C-based language, and the IRS described in the C-based language are compiled accordingly, but the timed software component constructed from the host CPU's native binary code need not be compiled. After performing the compiling, all the software components and hardware components are linked together.

Next, in step 320, the testbench is input and compiled. Further, in step 330, the components, i.e., verification models, processed in step 310 and the testbench processed in step 320 are linked together. Next, in step 340, under the control of the C-based simulator, the simulation described in FIG. 7 is performed by the executing program generated in step 330. In the final step 350, the result of the simulation is output on the display 20, etc. thus completing the co-verification.

Figure 11:
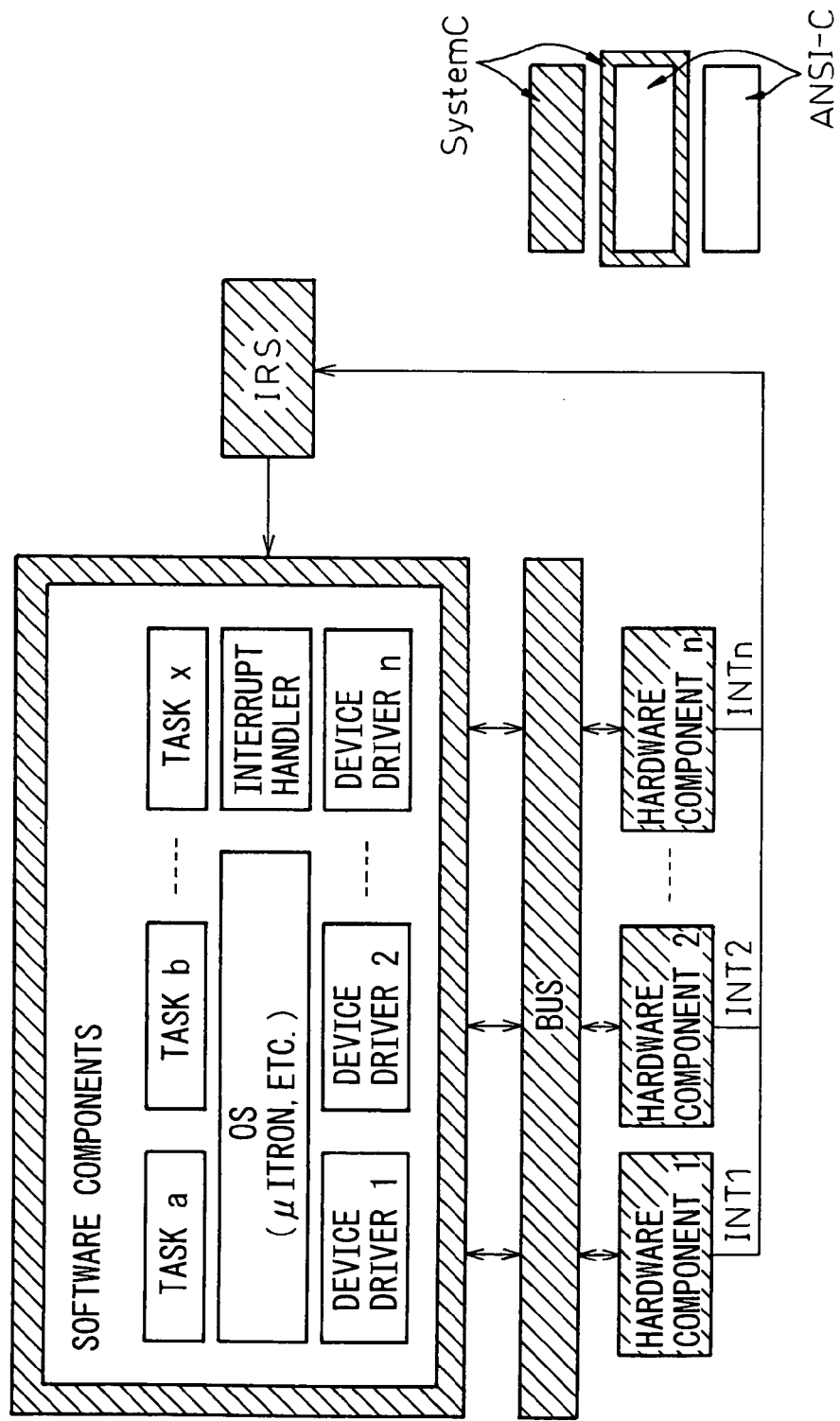
FIG. 11 is a diagram for explaining inter-component communication methods.

Finally, the communication methods employed in the present embodiment for communications between the components will be described with reference to FIG. 11. For communications between the software components, an ANSI-C communication method (Semaphore, MailBox, EventFlag) is employed, while for communications between the hardware components, a SystemC communication method (sc_event) is employed. On the other hand, for communications between a hardware component and a software component, the SystemC communication method (sc_event) is employed when activating hardware, and an interrupt method is employed when terminating the operation of hardware.

As for the communication methods employed between the components in the embodiments of the C-language-based design and verification techniques described in the non-patent documents 7 to 9, the SystemC communication method (sc_event) is employed for communications between the software components as well as for communications between the hardware components. On the other hand, for communications between a hardware component and a software component, the SystemC communication method (sc_event) is employed when activating hardware, and a polling method is employed when terminating the operation of hardware.

Figure 12:
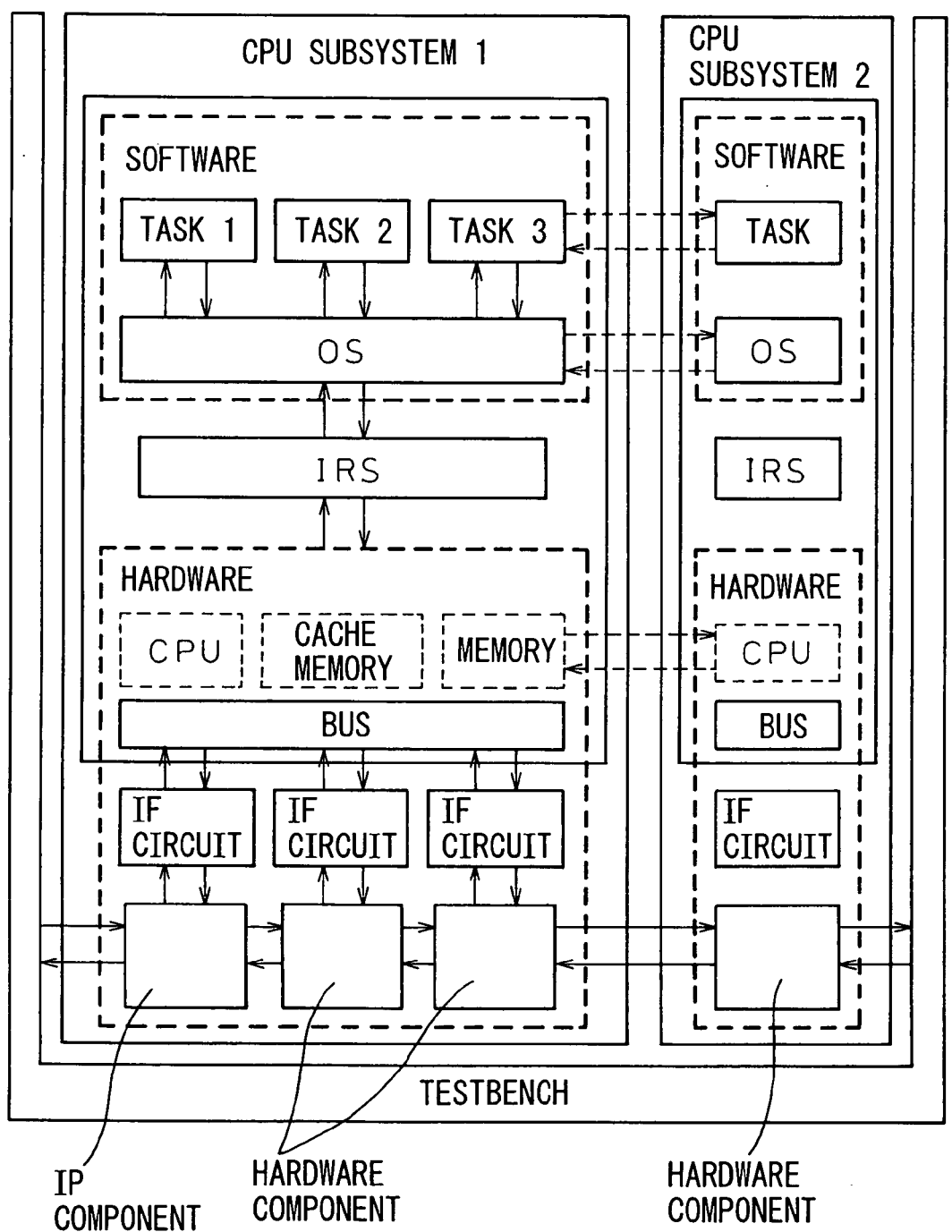
FIG. 12 is a diagram showing one example of a verification model for a multi-CPU system.

While the embodiment of the present invention has been described above, it will be appreciated that the present invention is not limited to the specific embodiment described above, and the present invention is also applicable, for example, to a verification model for a multi-CPU system such as shown in FIG. 12.

As described above, according to the present invention, as C-based native code simulation is implemented, the simulation performance (number of instructions/second) improves by a factor of $10^2$ to $10^3$ compared with the method that uses the prior art ISS, and a speedup of simulation for hardware/software verification is thus achieved. Furthermore, by performing time management based on the timed software components, the accuracy of timing verification is maintained. The present invention thus makes a great contribution to reducing the man-hours needed for hardware/software verification (in particular, software verification).

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

The invention claimed is:

1. A method, using a host CPU, for co-verifying hardware and software for a semiconductor device on which at least one target CPU and one OS are mounted, the hardware/software co-verification method comprising the steps of:
    (a) inputting, as a verification model, a timed software component described in a C-based language and compiling the same, inputting, as a verification model, a hardware component described in the C-based language and compiling the same, and linking together the compiled timed software component and the compiled hardware component, wherein an interrupt routine scheduler is input that is equivalent to an interrupt processing section of an instruction set simulator but is provided as an independent unit;
    (b) inputting a testbench and compiling the same;
    (c) linking together the verification models input in step (a) and the teatbench input in step (b);
    (d) performing a C-based native code simulation without per-instruction interpretation and execution, based on an executing program generated in step (c); and
    (e) outputting a result of the simulation performed in step (d).

2. The hardware/software co-verification method as claimed in claim 1 wherein, in order to generate in advance the timed software component described in the C-based language from an untimed software component described in ANSI-C, the method further comprises the steps of:
    inputting the untimed software component described in ANSI-C, and recognizing basic blocks and inserting control points;
    generating binary code native to a target CPU by compiling the untimed software component in which the control points have been inserted;
    computing execution time between the control points in the generated binary code native to the target CPU; and
    inserting, in accordance with the computed execution time, an execution time insertion statement at each of the control points inserted in the untimed software component, and thus outputting the timed software component described in the C-based language.

3. A method, using a host CPU, for co-verifying hardware and software for a semiconductor device on which at least one target CPU and one OS are mounted, the hardware/software co-verification method comprising the steps of:
    (a) inputting, as a verification model, a timed software component constructed from binary code native to the host CPU, inputting as a verification model, a hardware component described in a C-based language and compiling the same, and linking together the input timed software component and the compiled hardware component, wherein an interrupt routine scheduler is input that is equivalent to an interrupt processing section of an instruction set simulator but is provided as an independent unit;

(b) inputting a teatbench and compiling the same;

(c) linking together the verification models input in step (a) and the teetbench input in step (b);

(d) performing a C-based native code simulation without per-instruction interpretation and execution, based on an executing program generated in step (c); and (e) outputting a result of the simulation performed in step (d).

4. The hardware/software co-verification method as claimed in claim 3 wherein, in order to generate in advance the timed software component constructed from the binary code native to the host CPU from an untimed software component constructed from binary code native to a target CPU, the method further comprises the steps of:

inputting the untimed software component constructed from the binary code native to the target CPU, and converting the same into a software component expressed in the binary code native to the host CPU;

recognizing basic blocks and inserting control points in the software component expressed in the binary code native to the host CPU;

computing execution time between the control points in the software component in which the control points have been inserted; and inserting, in accordance with the computed execution time, binary code functionally equivalent to an execution time insertion statement at each of the control points inserted in the software component, and thus outputting the timed software component constructed from the binary code native to the host CPU.

5. A method, using a host CPU, for co-verifying hardware and software for a semiconductor device on which at least one target CPU and one OS are mounted, the hardware/software co-verification method comprising the steps of:

(a) inputting, as a verification model, a timed software component described in a C-based language and compiling the same, inputting, as a verification model, a timed software component constructed from binary code native to the host CPU and compiling the same, inputting, as a verification model, a hardware component described in the C-based language and compiling the same, and linking together the compiled or input timed software components and the compiled hardware component, wherein an interrupt routine scheduler is input that is equivalent to an interruct processing section of an instruction set simulator but is provided as an independent unit;

(b) inputting a testbench and compiling the same;

(c) linking together the verification models input in step (a) and the testbench input in step (b);

(d) performing a C-based native code simulation without pre-construction interpretation and execution, based on an executing program generated in step (c); and (e) outputting a result of the simulation performed in step (d).

6. The hardware/software co-verification method as claimed in claim 5 wherein, in order to generate in advance the timed software component described in the C-based language from an untimed software component described in ANSI-C, the method further comprises the steps of:

inputting The untimed software component described in ANSI-C, and recognizing basic blocks and inserting control points;

generating binary code native to a target CPU by compiling the untimed software component in which the control points have been inserted;

computing execution time between the control points in the generated binary code native to the target CPU; and inserting, in accordance with the computed execution time, an execution time insertion statement at each of the control points inserted in the untimed software component, and thus outputting the timed software component described in the C-based language.

7. The hardware/software co-verification method as claimed in claim 5 wherein, in order to generate in advance the timed software component constructed from the binary code native to the host CPU from an untimed software component constructed from binary code native to a target CPU, the method further comprises the steps of:

inputting the untimed software component constructed from the binary code native to the target CPU, and converting the same into a software component expressed in the binary code native to the host CPU;

recognizing basic blocks end inserting control points in the software component expressed in the binary code native to the host CPU;

computing execution time between the control points in the software component in which the control points have been inserted; and inserting, in accordance with the computed execution time, binary code functionally equivalent to an execution time insertion statement at each of the control points inserted in the software component, and thus outputting the timed software component constructed from the binary code native to the host CPU.

* * * * *

UNITED STATES PATENT AND TRADEMARK OFFICE
CERTIFICATE OF CORRECTION

PATENT NO.       : 7,155,690 B2                                        Page 1 of 1
APPLICATION NO.  : 10/766955
DATED            : December 26, 2006
INVENTOR(S)      : Hiroyuki Yamashita et al.

It is certified that error appears in the above-identified patent and that said Letters Patent is hereby corrected as shown below:

Column 10, Line 38, change "teatbench" to --testbench--.

Column 11, Line 9, change "teatbench" to --testbench--.

Column 11, Line 11, change "teetbench" to --testbench--.

Column 11, Line 53, change "interruct" to --interrupt--.

Column 12, Line 16, change "The" to --the--.

Column 12, Line 41, change "end" to --and--.

Signed and Sealed this

Twenty-sixth Day of June, 2007

JON W. DUDAS
*Director of the United States Patent and Trademark Office*